(12) United States Patent
Midy

(10) Patent No.: US 9,586,472 B2
(45) Date of Patent: Mar. 7, 2017

(54) MOTORCYCLE HAVING AN ENGINE WITH LIQUID COOLING

(71) Applicant: RDMO, Angers (FR)

(72) Inventor: Olivier Midy, Rochefort sur Loire (FR)

(73) Assignee: RDMO, Angers (FR)

( * ) Notice: Subject to any disclaimer, the term of this patent is extended or adjusted under 35 U.S.C. 154(b) by 0 days.

(21) Appl. No.: 14/414,134

(22) PCT Filed: Jul. 10, 2013

(86) PCT No.: PCT/FR2013/051656
§ 371 (c)(1),
(2) Date: Apr. 23, 2015

(87) PCT Pub. No.: WO2014/009662
PCT Pub. Date: Jan. 16, 2014

(65) Prior Publication Data
US 2015/0231960 A1 Aug. 20, 2015

(30) Foreign Application Priority Data

Jul. 13, 2012 (FR) ...................................... 12 56794

(51) Int. Cl.
*B62K 11/04* (2006.01)
*B60K 11/04* (2006.01)

(52) U.S. Cl.
CPC .............. *B60K 11/04* (2013.01); *B62K 11/04* (2013.01)

(58) Field of Classification Search
CPC .................................. B62K 11/04; B60K 11/04
USPC ..................... 180/68.4, 68.6, 229; 123/41.57
See application file for complete search history.

(56) References Cited

U.S. PATENT DOCUMENTS

| | | | | |
|---|---|---|---|---|
| 4,171,729 A | * | 10/1979 | Shibata .................. | B62K 11/00 165/41 |
| 4,478,306 A | * | 10/1984 | Tagami .................. | B60K 11/04 165/41 |
| 4,637,486 A | | 1/1987 | Iwai | |
| 4,641,721 A | * | 2/1987 | Yamaguchi ............ | B60K 11/04 180/229 |
| 4,876,778 A | * | 10/1989 | Hagihara ............. | B21D 53/085 29/428 |
| 6,695,089 B2 | * | 2/2004 | Adachi .................. | B62K 11/04 180/219 |
| 7,481,288 B2 | * | 1/2009 | Makuta .................... | B62M 7/12 180/68.1 |
| 8,181,729 B2 | * | 5/2012 | Hiramatsu ............. | B62K 11/04 180/68.1 |

(Continued)

*Primary Examiner* — Tony Winner
(74) *Attorney, Agent, or Firm* — Bachman & LaPointe, P.C

(57) ABSTRACT

A motorcycle comprising a frame with a side structure supporting a liquid-cooled engine, comprising at least one engine-coolant radiator, characterized in that said engine-coolant radiator is positioned behind the steering column and extends laterally on either side of the median longitudinal vertical plane of the motorcycle, the upper edge of said radiator being positioned above a horizontal plane passing through a point located in the upper two thirds of the axis of the steering column, said frame with a side structure having a housing for receiving the upper portion of said engine-coolant radiator, the engine-coolant radiator being positioned substantially vertical, the median plane of the radiator forming an angle of −20° to +20° relative to the vertical plane.

4 Claims, 2 Drawing Sheets

(56) References Cited

U.S. PATENT DOCUMENTS

| | | |
|---|---|---|
| 2002/0023795 A1 | 2/2002 | Nagai |
| 2006/0054372 A1* | 3/2006 | Ohzono .................. B62M 7/02 180/229 |
| 2008/0223643 A1 | 9/2008 | Arimura |
| 2014/0262580 A1* | 9/2014 | Bagnariol .............. B60G 7/006 180/218 |

* cited by examiner

MOTORCYCLE HAVING AN ENGINE WITH LIQUID COOLING

BACKGROUND

The present invention relates to the field of motorcycles comprising a frame with a side structure supporting a liquid-cooled engine, comprising an engine-coolant radiator. The invention relates, specifically, to the positioning of the engine-coolant radiator.

PRIOR ART

Various solutions are known in the prior art for housing the radiator in the front vertical or transverse position under the steering column, in the front position in front of the column, the lateral position, or even under the saddle.

DRAWBACKS OF THE PRIOR ART

Most commercially available motorcycles use an architecture in which the radiator is placed at the front. The radiator size required for effective cooling leads to considerable bulkiness.

When the radiator is arranged transversely, it leads to a considerable lateral extension. When arranged vertically, it imposes a considerable wheelbase.

A known first solution is depicted in patent US2002/0023795, which relates to a scooter comprising a radiator placed under the steering column, between the front wheel and the engine. In order to provide appropriate cooling, it is necessary to provide a considerable width, resulting in lateral bulkiness of the front portion of the scooter, which is not suitable for a road motorcycle.

Patent US2010/096201 describes a solution in which the radiator is arranged substantially horizontal, partially under the seat. The flow of cooling air is provided by an air intake supplying the airbox of the engine as well as the radiator. The air intake is configured such as to be housed between the tubes of the steering column. The air flow is insufficient to provide correct cooling of a motorcycle.

Also known in the prior art are solutions which consist in placing one or two radiator modules laterally, on either side of a median longitudinal vertical plane of the motorcycle. Patent US2008/0223643 describes such a solution, wherein the radiator is offset laterally on one side of the longitudinal axis. Said solution is not very satisfactory, since it increases the lateral bulkiness.

U.S. Pat. No. 4,637,486 presents another example of a solution with a laterally offset radiator.

Said various solutions do not make it possible to provide effective cooling with a radiator having reduced lateral bulkiness which is compatible with the architecture of a road motorcycle, in particular when the engine is in the forward position.

SUMMARY

In order to solve said drawbacks the invention, in accordance with the most general acceptance thereof, relates to a motorcycle comprising a frame with a side structure supporting a liquid-cooled engine, comprising at least one engine-coolant radiator, characterised in that said engine-coolant radiator is positioned behind the steering column and extends laterally on either side of the median longitudinal vertical plane of the motorcycle, the upper edge of said radiator being positioned above a horizontal plane passing through a point located in the upper two thirds of the axis of the steering column, said frame with a side structure having a housing for receiving the upper portion of said engine-coolant radiator, the engine-coolant radiator being positioned substantially vertical, the median plane of the radiator forming an angle of −20° to +20° relative to the vertical plane.

The radiator extends on either side of the median longitudinal vertical plane of the motorcycle. It is positioned behind the steering column, in front of a transverse vertical plane passing through the axis of the crankshaft.

"Steering column" in the present patent is understood to refer to the hollow tube which is arranged at the front of the motorcycle, and which contains the steering tube bushes which in turn are housed in the ball seats. Said hollow tube receives the steering shaft for the function of rotating in the bearings of the steering column. The role thereof is to support and guide the fork/wheel assembly. The steering column determines the castor angle.

The steering includes, in a known manner, two steering crowns connecting the fork (and the front wheel) to the steering column.

The lower crown is secured to the steering shaft. The upper crown supports the handlebar or the two half-handlebars. The two crowns define the dish, in other words, the distance between the steering column and the fork tubes.

The definition of the intersection point with the horizontal plane refers to the segment of the steering column comprised between the steering crowns. Said point is located in the upper two thirds of said segment, on the longitudinal axis of said segment.

Advantageously, the upper edge of the radiator is located between an upper horizontal plane passing through the upper crown of the fork and a lower horizontal plane passing through the lower crown of the fork.

The engine-coolant radiator is preferably positioned substantially vertical, the median plane of the radiator forming an angle of −20 degrees to +20 degrees relative to the vertical plane.

According to one variant, the radiator is curved, in particular relative to a transverse horizontal axis of curvature or optionally relative to a vertical axis of curvature.

According to a first variant, said frame with a side structure is made up of a double-beam structure.

According to a second variant, said frame with a side structure is made up of a self-supporting shell.

According to a third variant, said frame with a side structure is made up of a lattice frame.

Advantageously, said self-supporting shell has two openings each leading into a conduit passing longitudinally through the hollow spaces of said self-supporting shell, said conduits leading into a transverse recess intended for receiving the upper portion of the engine-coolant radiator.

BRIEF DESCRIPTION OF THE DRAWINGS

Further objectives and advantages of the invention will become apparent from the following description, made in reference to the appended drawings, wherein.

DETAILED DESCRIPTION

Figure 1:
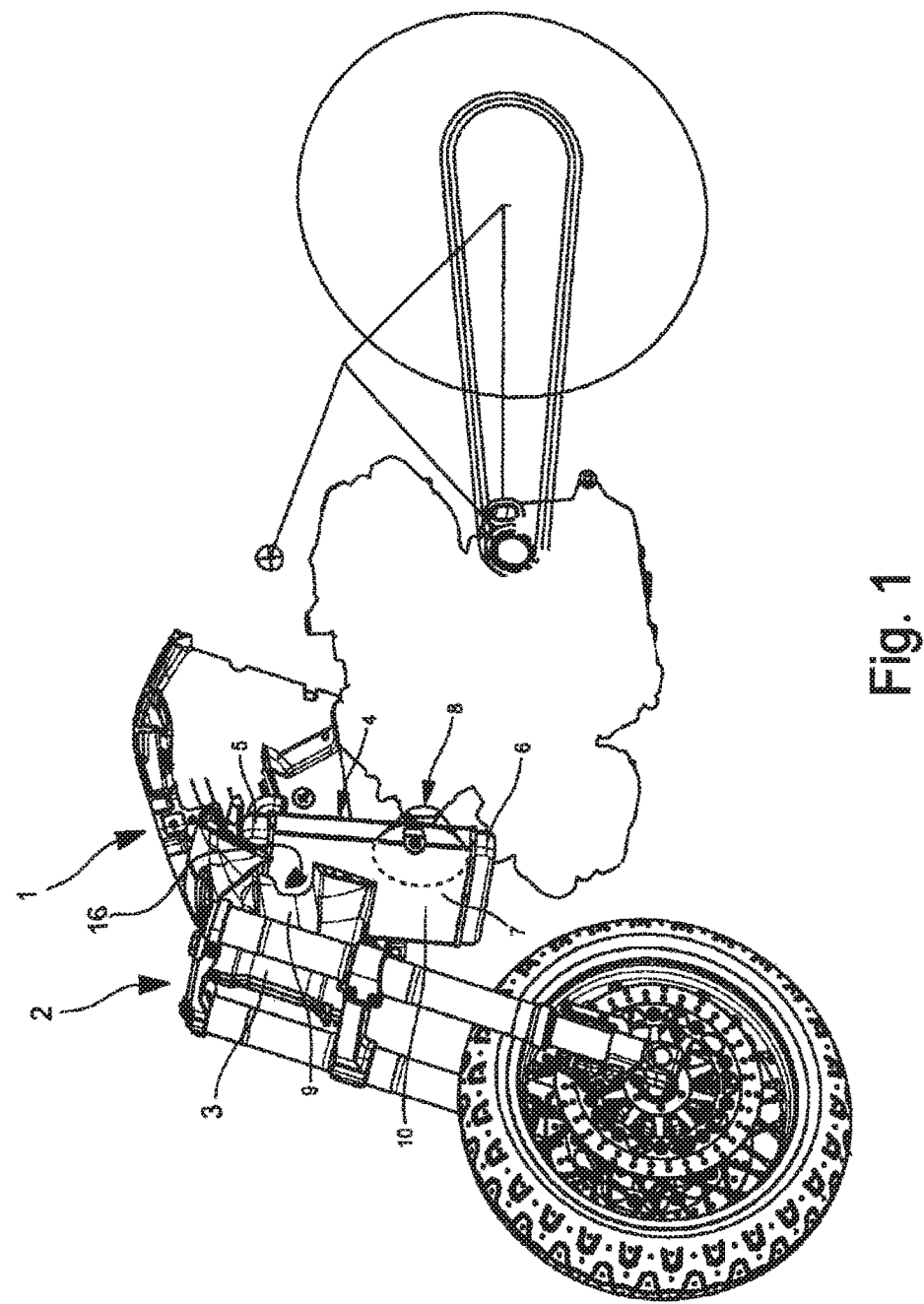
FIG. 1 is a view of a motorcycle according to the invention with a partial cut-out of the front left area of the shell.

FIG. 1 is a diagrammatic view of a motorcycle according to the invention, with a self-supporting shell (1) presented with a partial cut-out to better understand the figure. The implementation of the invention is not limited to a motorcycle having a self-supporting shell, since the described example is not limiting. The invention applies to all types of motorcycle frame structures, in particular to structures with double beams or lattice structures.

The motorcycle comprises an inline two-cylinder engine block, with cylinders arranged longitudinally and not transversely and forming an angle of around 25° relative to the horizontal plane. The front cylinder is lower than the rear cylinder.

The architecture described as an example is based on a self-supporting shell (1) providing the functions of frame and body. The motorcycle does not comprise any additional beam or frame providing a direct mechanical link between the steering column and the engine or swing arm. The shell (1) provides all the rigidity and geometric characteristics of the motorcycle. Likewise, the self-supporting shell directly forms the visible outer body (the same as the regular tank of a motorcycle) and, where appropriate, receives outer covering elements such as knee grips.

Said shell (1) is a single, integral cast-metal part made by casting aluminium, aluminium or magnesium alloy or even carbon.

The shell (1) has a bump (2) at the front which constitutes the steering column (3). Said bump (2) has a tubular shape, receiving the steering tube bushes. Said bump (2) is built into the shell (1) and is not an added or welded part.

The general shape of the shell (1) is that of a motorcycle tank, extending longitudinally and being extended at the rear by an area forming the driver's seat.

The liquid radiator is positioned behind the steering column (3). The height of said radiator is greater than the height of the steering column, in the described example, in order to guarantee optimal effectiveness.

The lower edge of the coolant radiator (4) extends until a horizontal plane passing through the front wheel (11), preferably above the brake discs (15).

The engine-coolant radiator (4) is additionally placed in front of the transverse vertical plane passing through the engine crankshaft.

The front cylinder head extends under the lower edge of the liquid radiator (4).

The engine-coolant radiator (4) is made up of two tanks (5, 6) surrounding a cooling core (7) which extends substantially vertically. The engine coolant circulates vertically in said core (7) which is partitioned vertically to allow the radiator intake and outlet to be installed on the upper tank (5).

The upper portion of the radiator (4) and in particular all of the upper tank (5) are placed in a transverse recess provided on the self-supporting shell (1). Said recess is closed at the sides such as to form a notch allowing the top of the radiator (4) to be inserted.

Front air intakes (9) pass through the front portion of the self-supporting shell (1) to lead into the upper portion of the radiator (4). Said air intakes (9) are arranged on either side of the steering column (3).

The lower portion (10) of the radiator, in particular the lower tank (6), extends past the lower portion of the shell (1). It can be visually concealed by a narrow grille.

An electric fan (8) is installed on the rear surface of the core (7) in order to provide forced ventilation, in particular when the motorcycle is halted.

The size of the core is determined by the exchange surface, which imposes a constraint on the width and height of the radiator. The width of the core determines the width of the frame and, in the described example, conditions the width of the transverse notch.

Figure 2:
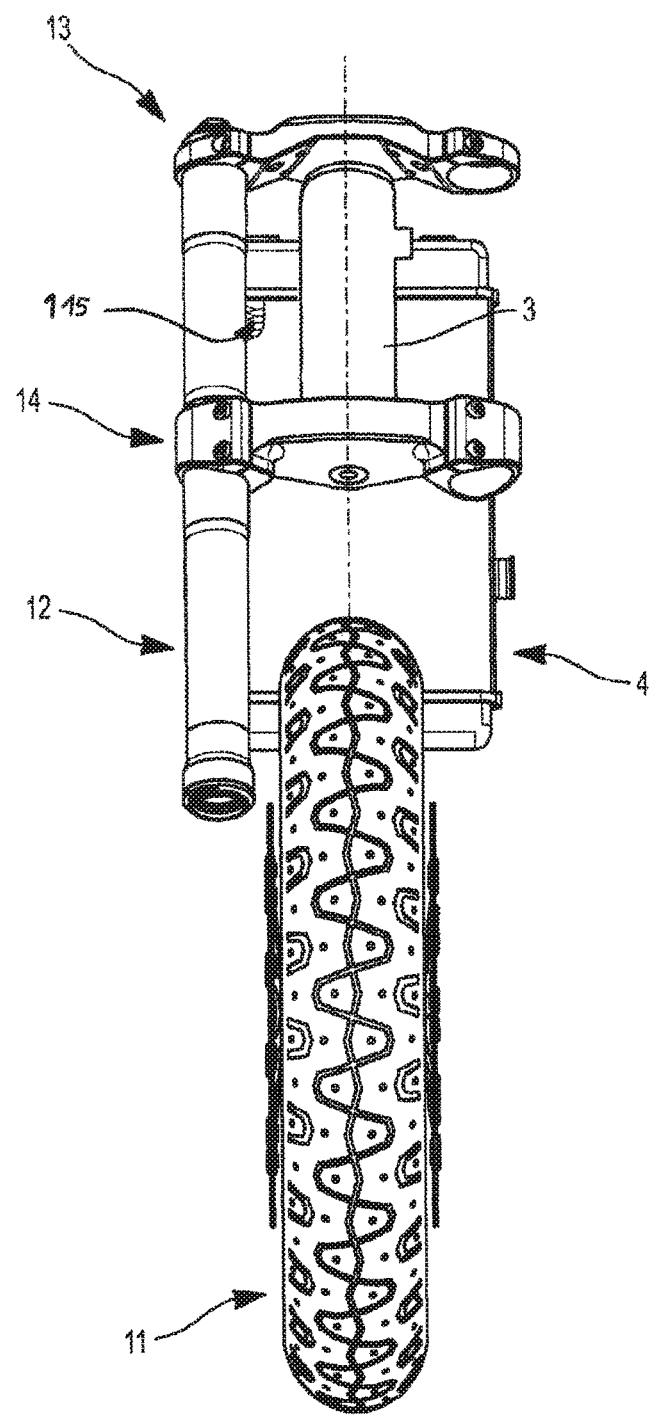
FIG. 2 is a front view of a motorcycle according to the invention.

FIG. 2 is a front view. The front wheel (11) is supported in a known manner by the fork arms (12) which are flanged by an upper fork crown (13) and a lower fork crown (14). The radiator (4) is located behind the steering column (3) and the fork (12). In order to simplify the drawing, a single fork arm is shown.

The upper portion of the radiator (4) extends until a plane comprised between the two fork crowns (13, 14). The lower portion of the radiator (4) extends until a horizontal plane determined by the bulkiness of the engine and the front wheel in fully pushed-in position (for example during braking).

The radiator (4) is mounted according to a vertical plane or slightly tilted with an angle of 5° to 10° in the described example.

The described radiator is planar. It is possible to provide curved radiators without departing from the present invention.

The self-supporting shell (1) has two openings each leading into a conduit (115) passing longitudinally through hollow spaces (16) of the self-supporting shell (1). The conduits (115) lead into a transverse recess intended for receiving the upper portion of the engine-coolant radiator (4).

The invention claimed is:

1. A motorcycle comprising:
 a frame with a side structure is made up of a self-supporting shell supporting a liquid-cooled engine,
 said liquid-cooled engine comprising at least one engine-coolant radiator,
 wherein said at least one radiator is positioned between a steering column and a transverse vertical plane passing through an axis of a crankshaft and extends laterally on either side of a median longitudinal plane of the motorcycle,
 an upper portion of said at least one radiator being positioned above a horizontal plane passing through a point located in an upper two-thirds of the steering column,
 said at least one radiator being positioned substantially vertically,
 wherein said self-supporting shell has a transverse recess suitable for receiving the upper portion of said at least one radiator,
 a median plane of said at least one radiator forming an angle of −20 degrees to +20 degrees relative to a vertical plane of the motorcycle,
 wherein said self-supporting shell has two openings each leading into a conduit passing longitudinally through the hollow spaces of said self-supporting shell, and
 said conduit leading into said transverse recess intended for receiving the upper portion of said at least one radiator.

2. The motorcycle according to claim 1, wherein the engine-coolant radiator is curved.

3. The motorcycle according to claim 1, wherein said engine-coolant radiator is symmetrical relative to the median longitudinal plane.

4. The motorcycle according to claim 1, wherein a lower edge of said engine-coolant radiator extends until a horizontal plane passing through a front wheel.

* * * * *